(12) United States Patent
Goswami et al.

(10) Patent No.: US 11,748,839 B2
(45) Date of Patent: Sep. 5, 2023

(54) EFFICIENT FAST RANDOM ACCESS ENABLED GEOMETRY ATTRIBUTE COMPRESSION MECHANISM

(71) Applicant: Samsung Electronics Co., Ltd., Suwon-si (KR)

(72) Inventors: Nilanjan Goswami, Livermore, CA (US); Swati Atrish, San Jose, CA (US)

(73) Assignee: SAMSUNG ELECTRONICS CO., LTD.

(*) Notice: Subject to any disclaimer, the term of this patent is extended or adjusted under 35 U.S.C. 154(b) by 104 days.

(21) Appl. No.: 16/896,193

(22) Filed: Jun. 8, 2020

(65) Prior Publication Data

US 2021/0327017 A1    Oct. 21, 2021

Related U.S. Application Data

(60) Provisional application No. 63/011,283, filed on Apr. 16, 2020.

(51) Int. Cl.
| | |
|---|---|
| G06T 1/20 | (2006.01) |
| G06T 15/00 | (2011.01) |
| G06F 7/483 | (2006.01) |
| G06F 9/30 | (2018.01) |
| G06F 9/38 | (2018.01) |

(52) U.S. Cl.
CPC ............ G06T 1/20 (2013.01); G06F 7/483 (2013.01); G06F 9/30145 (2013.01); G06F 9/3867 (2013.01); G06T 15/005 (2013.01)

(58) Field of Classification Search
CPC ......... G06T 1/20; G06T 15/005; G06T 9/001; G06T 9/005; G06F 7/483; G06F 9/30145; G06F 9/3867

USPC ......................................................... 345/530
See application file for complete search history.

(56) References Cited

U.S. PATENT DOCUMENTS

| | | | |
|---|---|---|---|
| 7,324,115 B2* | 1/2008 | Fraser ................... | G06T 9/001 |
| | | | 345/419 |
| 8,254,701 B1 | 8/2012 | Diard | |
| 9,628,107 B2* | 4/2017 | Dickie ................... | H03M 7/24 |
| 2009/0033672 A1 | 2/2009 | Jiao et al. | |
| 2010/0034478 A1* | 2/2010 | Kajiwara ............... | H04N 19/13 |
| | | | 382/248 |
| 2011/0216069 A1 | 9/2011 | Keall et al. | |
| 2013/0293565 A1 | 11/2013 | Arvo | |
| 2014/0362100 A1 | 12/2014 | Cerny et al. | |
| 2015/0379682 A1* | 12/2015 | Golas .................... | G06T 9/00 |
| | | | 345/555 |
| 2015/0379684 A1 | 12/2015 | Ramani et al. | |
| 2016/0005140 A1* | 1/2016 | Engh-Halstvedt .... | G06T 15/005 |
| | | | 345/506 |
| 2016/0328822 A1 | 11/2016 | Liao et al. | |

* cited by examiner

*Primary Examiner* — Jacinta M Crawford
(74) *Attorney, Agent, or Firm* — Renaissance IP Law Group LLP (57) ABSTRACT

A graphics pipeline of a graphics processing unit includes a compressor that receives one or more attributes (positional and non-positional) of a vertex that is output from a vertex shader. The compressor determines a format of the one or more attributes, and separates each attribute into parts based on the format of the attribute. The compressor compresses each respective part of the attribute based on a type of the part. The compressed parts of the attribute are stored in an attribute storage.

20 Claims, 6 Drawing Sheets

EFFICIENT FAST RANDOM ACCESS ENABLED GEOMETRY ATTRIBUTE COMPRESSION MECHANISM

CROSS-REFERENCE TO RELATED APPLICATION

This application claims the priority benefit under 35 U.S.C. § 119(e) of U.S. Provisional Application No. 63/011,283, filed on Apr. 16, 2020, the disclosure of which is incorporated herein by reference in its entirety.

TECHNICAL FIELD

The subject matter disclosed herein relates to graphics processing units (GPUs). More specifically, the subject matter disclosed herein relates to a frontend pipe of a GPU (compression) and a backend pipe of a GPU (decompression) that compresses and decompresses positional and non-positional attribute data.

BACKGROUND

Traditional computer graphics define the content that is to be drawn in terms of geometry of meshes. Meshes may be formed using vertices and each vertex may have several properties or attributes that define an object that is to be rendered. Example properties may include position, color, texture, normal, binormals, tangents, various lighting parameters, etc. In computer graphics, these properties may be referred as vertex attributes.

SUMMARY

An example embodiment provides a method that may include determining a format of one or more attributes of a vertex that is output from a vertex shader in which the one or more attributes may include one or more positional attributes and one or more non-positional attributes; separating each of the one or more attributes into parts based on the format of the attribute; compressing each respective part of the attribute based on a type of the part; and storing in a memory the compressed parts of the attribute of the vertex. In one embodiment, the format of a first attribute may include a floating-point format in which parts of the first attribute in the floating-point format may include a sign part, an exponent part, and a mantissa part, and in which compressing each respective part of the first in the floating-point format may include: compressing the sign part using a run-length encoding; determining a first order differential of the exponent part; compressing the exponent part using a zero-run encoding and a Golomb-Rice coding; determining a first order differential of the mantissa part; and compressing the mantissa part using a Golomb-Rice coding. In another embodiment, the format of a first attribute may include a fixed-point format in which parts of the first attribute in the fixed-point format may include a sign part, an integer part, and a fractional part, and in which compressing each respective part of the first attribute in the fixed-point format may include compressing the sign part using a run-length encoding; compressing the integer part using a Golomb-Rice coding; and compressing the fractional part using a Golomb-Rice coding. In yet another embodiment, the format a first attribute may include an integer format in which parts of the first attribute in the integer format may include a sign part and an integer part, and in which compressing each respective part of the first attribute in the integer format may include: compressing the sign part using a run-length encoding; and compressing the integer part using a Golomb-Rice coding.

An example embodiment provides a method that may include reading from a memory compressed parts of an attribute of a vertex; and decompressing the compressed parts of the attribute by: using a run-length decoding based on a compressed part comprising a sign part of the attribute; using a zero-run decoding and a Golomb-Rice decoding based on a compressed part comprising an exponent part of the attribute; and using a Golomb-Rice decoding based on a compressed part comprising one of a mantissa part, an integer part, and a fractional part of the attribute.

An example embodiment provides a graphics pipeline of a graphics processing unit in which the graphics pipeline may include a compressor that receives one or more attributes of a vertex that is output from a vertex shader in which the compressor may determine a format of each attribute, separate each attribute into parts based on the format of the attribute, compress each respective part of the attribute based on a type of the part, and store in a memory the compressed parts of the attribute.

BRIEF DESCRIPTION OF THE DRAWING

In the following section, the aspects of the subject matter disclosed herein will be described with reference to exemplary embodiments illustrated in the figure, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth.

The subject matter disclosed herein provides an effective compression technique of vertex attribute data (either pre-vertex shader or post-vertex shader) that may save memory bandwidth and may improve graphics processor unit (GPU) performance. More specifically, compression of attribute data (both positional and non-positional) may reduce post-binning-pass aggregated off-chip memory traffic. The positional/non-positional attribute compression/decompression technique disclosed herein may significantly reduce the memory bandwidth of the multiple vertex attribute fetches in a multi-pass-rendering architecture. Moreover, reduced off-chip and on-chip traffic provided by compression of attribute data may provide a power savings in comparison to memory traffic associated with attribute data that has not been compressed.

In one embodiment, the subject matter disclosed herein provides compression of positional and non-positional vertex attributes. Compression of the attributes may be a context-aware compression or a context-unaware compression. For context-aware compression, an attribute may be separated into smaller blocks, or chunks, based on components of an attribute and a selected compression technique may be applied to each different attribute component block. For example, by knowing an attribute type, such as position, color, normal, etc., the attribute may be separated into variable-sized components (e.g., sign, exponent, mantissa, fractional, integer), a compression technique may be used that may be tailored to the component data. Separation of attribute components also may include additional information relating to tentative ranges of data for particular components that may be compressed with the particular components.

The attribute compression technique disclosed herein may be implemented as a module in hardware, software and/or firmware to provide a compression-compute shader that compresses pre-vertex-shader and/or post-vertex-shader vertices to generate a compressed list of attributes. Simple, yet effective compression techniques, such as, but not limited to, delta compression, run-length encoding, zero-encoding, and Golomb-Rice encoding, may be used to provide a multi-stage, parallel, fast random-access encoding and decoding technique that may provide a high throughput and a low-latency attribute compression and decompression technique. Additionally, a custom run-length zero-encoding technique may be used that effectively compresses zeroes in attribute data more efficiently than a traditional run-length encoding.

One embodiment disclosed herein provides a post-vertex-shader attribute-type aware/unaware compression technique having a within-block sequential access and cross-block random-access capability and a low average latency. The compression technique that may be used to compress attribute data may vary depending upon the format of the attribute. Another embodiment disclosed herein provides a pre-vertex shader attribute-type aware/unaware compression technique.

Header information for compressed attribute data and the compressed attribute data may be combined in a unified storage to avoid latencies associated with additional overhead associated with hierarchical memory access. The data component may use adaptive compression techniques along with a zero-encoding technique that reduces overhead associated with a traditional run-length encoding technique that may be optimized for sequential redundant data with no overhead of frequent fixed-size symbol encoding.

Figure 1:
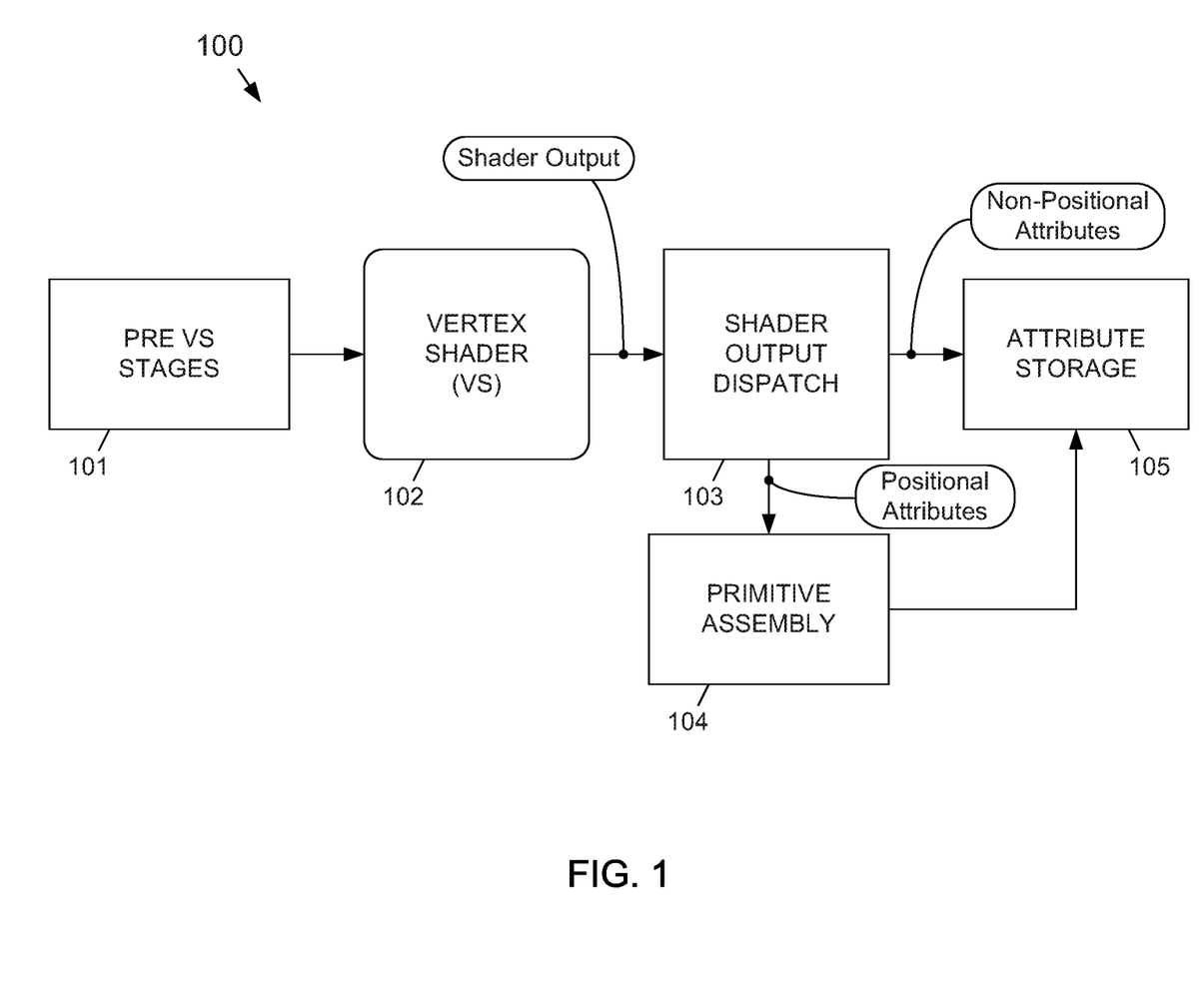
FIG. 1 depicts a high-level block diagram of an example embodiment of a graphics pipeline.

FIG. 1 depicts a high-level block diagram of an example embodiment of a shader core graphics pipeline 100. The shader core graphics pipeline 100 may include pre-vertex shader (VS) stages 101, a vertex shader (VS) 102, a shader output dispatch 103, a primitive assembly 104, and an attribute storage 105, such as dynamic random access memory (DRAM). The stages of the graphics pipeline 100 usually follow the order depicted, and one or more stages may operate as a pass-through depending on the needs of the application.

During a first phase of a graphics rendering process, the pre-vertex shader stages 101 may fetch primitives from a memory (not shown), perform some processing on the primitives, and then send the primitives to the VS 102. The VS 102 may perform a transformation and several custom processing steps to process three-dimensional (3D) geometry. The VS 102 may also perform front-end processing on attributes associated with vertices of the primitives. In addition to the VS 102, the graphics hardware rending pipeline 100 may optionally include a hull shader (HS), a domain shader (DS) and a geometry shader (GS) (all not shown) depending upon the needs of an application and the capability of the pipeline 100.

The output of the VS 102 may be sent to the shader output dispatch 103 where positional attributes are sent to the primitive assembly 104, and where non-positional attributes are sent to the attribute storage 105. The output of the primitive assembly 104 may also be sent to the attribute storage 105. Shaded attributes (position and non-position) of the vertex shader stages (VS/HS/DS/GS) may be passed on to a fragment-processing pipeline (not shown).

The positional/non-positional attributes may be application-defined quantities and a driver may arrange the attributes in the attribute storage 105 as per a request of the application (i.e., in a graphics application programming interface (API) defined manner). Typically, attribute data are not compressed and may include a significant amount of redundancy.

In a traditional tile-based-deferred-rendering (TBDR) architecture, a full set of geometries or partial yet large set of geometries may be processed in vertex shader stages and a per-tile geometry overlap may be identified. Until fragment processing starts, the full set of data may be retained in a storage (off-chip or on-chip) in its entirety or in grouped in batches. The storage arrangement may contribute to a large amount memory traffic (on-chip and/or off-chip). Memory bandwidth and graphics performance and power consumption may be closely intertwined. Many graphics applications may be inherently memory bound already, and based on TBDR processing, an application may experience non-negligible loss of performance based on vertex attributes being stored in a traditional manner.

Attributes that have been vertex shaded may include both positional attributes and non-positional attributes. Both positional and non-positional attributes are vectors that may contain many scalars per vector. An example of a positional attribute may use four scalars (X, Y, Z, W) as coordinates in which, for example, X may be a horizontal position in an image, Y may be a vertical position in the image, Z may be a depth or distance from the eye in the image, and W may be a homogeneous coordinate that may be used to perform perspective-correct interpolation. Example post vertex shading (VS/GS/HS/DS) formats for positional attributes may include 32-bit floating point (F32), 16-bit floating point (F16), any other custom floating-point format, and fixed point (sign.integer-bits.fraction-bits). An example of a non-positional attribute is color, which may also use four scalars (R, G, B, A) in which, for example, R represents an intensity value for red, G represents an intensity value for green, B represents an intensity value for blue, and A is a number between 0.0 (fully transparent) and 1.0 (opaque). Example formats for non-positional attributes may include F32 and 16-bit floating point (F16).

Positional attributes may continue from the shader output dispatch 103 to the primitive assembly 104, and then to the attribute storage 105 before binning. Both positional and non-positional attributes may be saved in the attribute storage 105 and may vary in size depending upon the particular attributes and the format of the particular attributes being processed. Binning may only use a block and primitive indictor per bin to point to a compressed primitive block and the primitive in that block.

The pre-VS stages 101 and the VS 102 may fetch attributes from a vertex buffer object (VBO) (not shown). Batching may be limited based on a limited varying storage size. After being processed by the VS 102, non-positional attributes may be saved on chip, in which case there would be no off-chip traffic. Post-vertex shader attributes may, however, be saved on-chip and/or off-chip.

Figure 2:
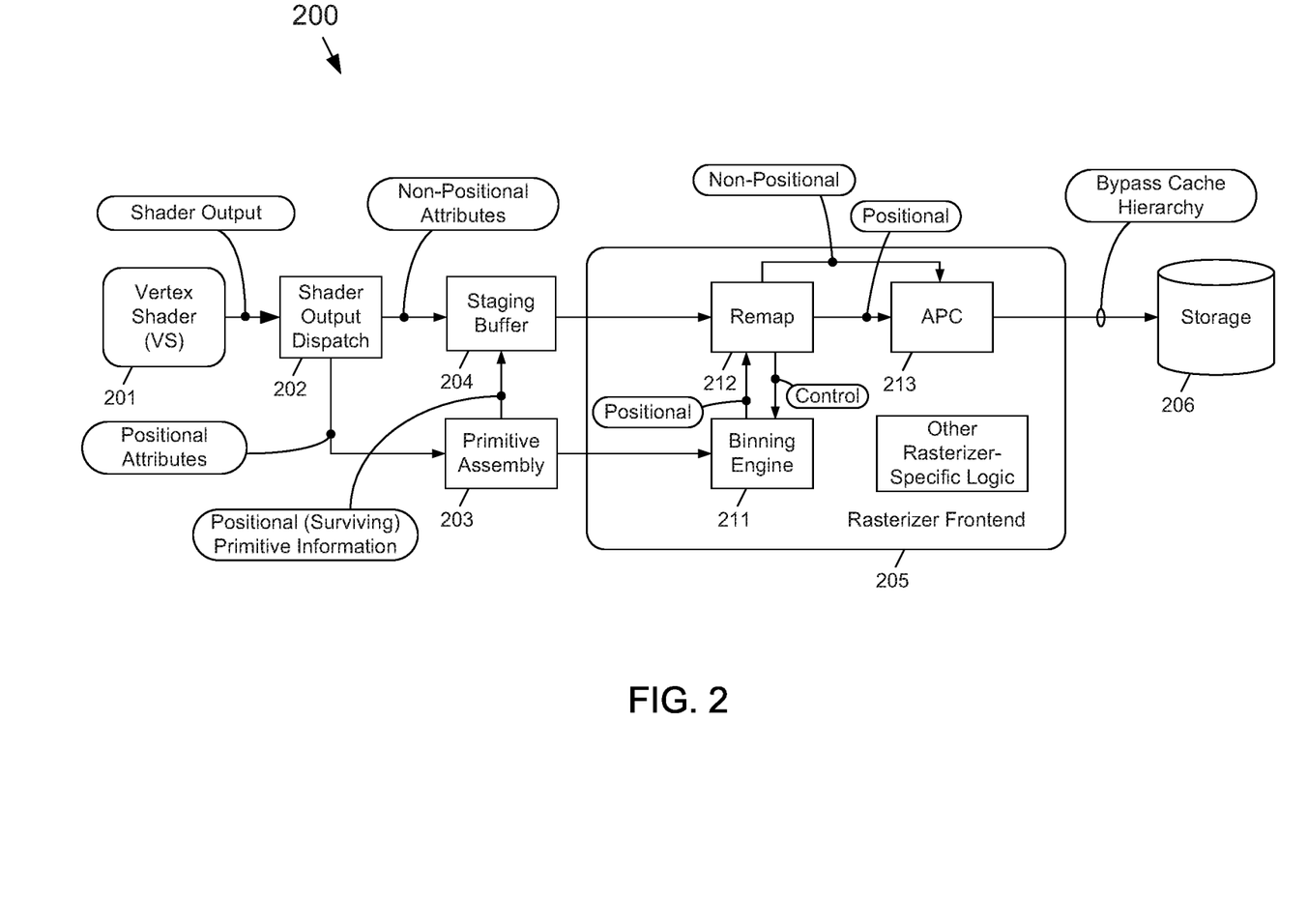
FIG. 2 depicts a high-level block diagram of an example embodiment of a graphics pipeline showing attribute-compression flow during a binning phase according to the subject matter disclosed herein.

FIG. 2 depicts a high-level block diagram of an example embodiment of graphics hardware pipeline 200 showing attribute-compression flow before a binning phase according to the subject matter disclosed herein. The graphics hardware pipeline 200 may include vertex shader (VS) 201, a shader output dispatch 202, a staging buffer 204, a primitive assembly 203, a rasterizer frontend 205 and an attribute storage 206, such as off-chip DRAM. The rasterizer frontend 205 may include a binning engine 211, a remap logic 212, an adaptive parameter compressor (APC) 213, and other rasterizer-specific logic. Pre-vertex shader stages are not shown in FIG. 2. The portion of the shader core graphics pipeline 200 depicted in FIG. 2 may be implemented as a module using fixed-function hardware and/or as software and/or as programmable logic.

The VS 201 may perform front-end processing on attributes associated with the vertices of the primitives by, for example, performing a transformation and one or more custom processing steps to process three-dimensional (3D) geometry as projected onto a two-dimensional surface. The VS 201 may apply processing steps on the attributes and subsequently outputs shaded attributes. In addition to the VS 201, the shader core graphics pipeline 200 may optionally include a hull shader (HS), a domain shader (DS) a geometry shader (GS) and a compute shader (CS) (all not shown) depending upon the needs of an application.

The output of the VS 201 may be sent to the shader output dispatch 202. The shader output dispatch 202 may send positional attributes to the primitive assembly 203, and may send non-positional attributes to the staging buffer 204. The staging buffer 204 may provide a temporary staging area to hide any latency associated with the primitive assembly 203. The staging buffer 204 may also provide a temporary storage where blocks of non-positional attribute data may be accumulated before being sent to the remap logic 212.

The output of the primitive assembly 203 may be sent to the binning engine 211. The positional attribute data output from the binning engine 211 may be sent to the remap logic 212. The output of the staging buffer 204 may be sent to the remap logic 212. The remap logic 212 outputs transformed non-positional attribute data and transformed positional attribute data to the APC 213. The binning engine 211 may receive control information from the remap logic 212 relating to the positional attribute data.

In the frontend portion of the pipeline 200 (i.e., pre-vertex stages and the VS 201), the data processed may be arranged in a vertex-major data arrangement, which may also be referred to as an array-of-structure (AoS) data arrangement. In the backend pipe 205, the data processed may be arranged in an attribute-major data arrangement, which may also be referred to as a structure-of-array (SoA) data arrangement. The remap engine 212 may transform the non-positional attribute data received from the staging buffer 204 and the positional attribute data received from the binning engine 211 from an AoS data arrangement to a SoA data arrangement.

The APC 213 compresses the non-positional attribute data and the positional attribute data, as described in greater detail in connection with FIG. 4A. In one embodiment, the APC 213 may use a lossless compression technique, such as, but not limited to, Golomb-Rice encoding, delta compression, run-length encoding, and zero-encoding. In another embodiment, a lossy compression technique may be used to further reduce traffic, but at the cost of a reduced rendered-image quality. The output of the backend pipe 205 may be directly sent to storage (on chip or off chip) bypassing any cache hierarchy because the output of the backend pipe may not be read back immediately, so no caching may be needed. Power consumption may also be reduced because the output of the backend pipe 205 is sent directly to storage 206 rather than being sent through a caching hierarchy.

Figure 3:
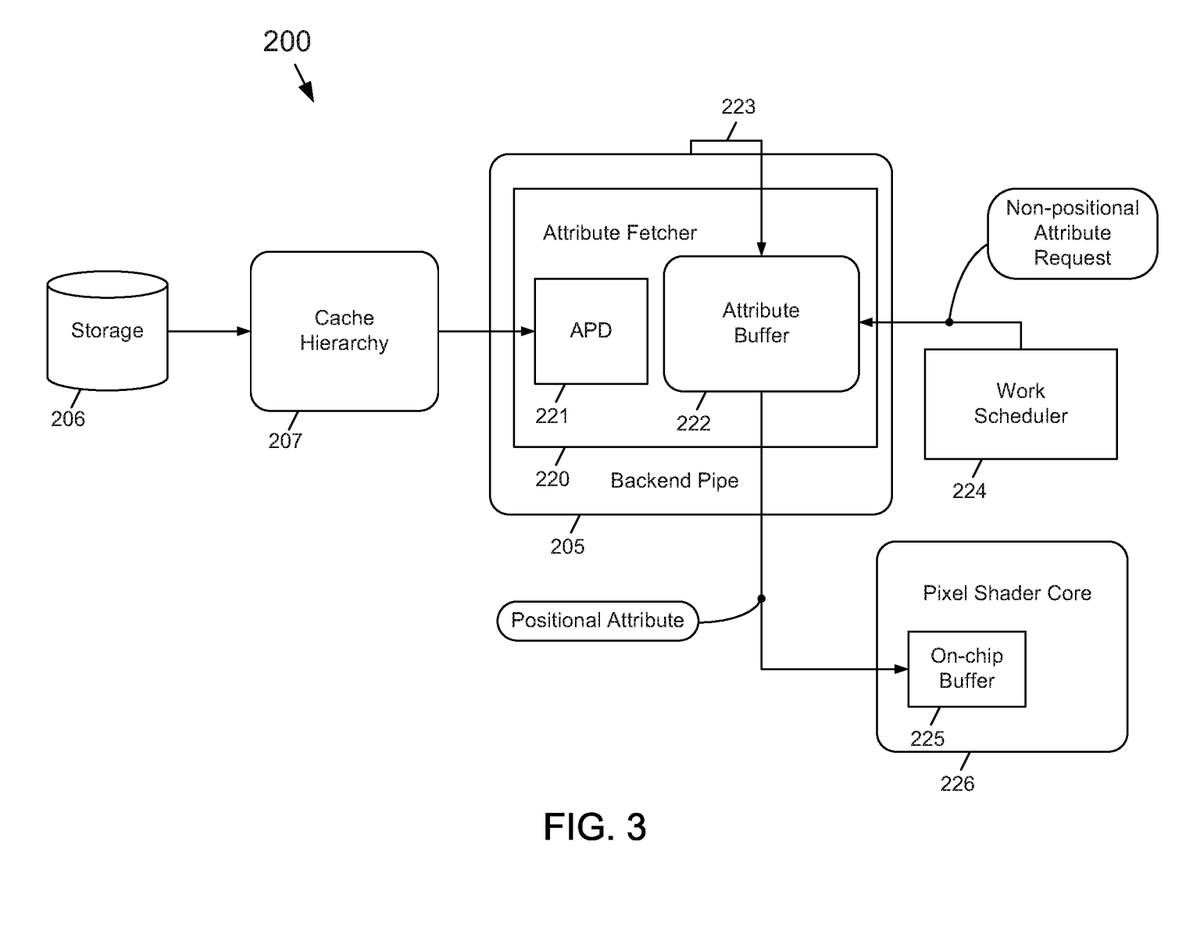
FIG. 3 depicts a high-level block diagram of an example embodiment of the graphics pipeline showing attribute-decompression flow after the binning phase according to the subject matter disclosed herein.

FIG. 3 depicts a high-level block diagram of an example embodiment of the shader core graphics pipeline 200 showing attribute-decompression flow after the binning phase according to the subject matter disclosed herein. During attribute decompression, the compressed attribute data are sent by blocks from storage 206 to a cache hierarchy 207. From the cache hierarchy 207, the compressed attribute data is sent to an adaptive parameter decompressor (APD) 221 within an attribute fetcher (AF) 220. The APD 221 decompresses the attribute data based on the way it was compressed, as indicated by header information associated with the compressed attribute data. Decompressed attribute data may be temporarily stored in an attribute buffer 222. The attribute buffer 222 may respond to backend pipe requests 223 and requests received from a work scheduler 224 for non-positional attribute data. Positional attribute data may be sent to an on-chip buffer 225 within a pixel shader core 226. The portion of the shader core graphics pipeline 200 depicted in FIG. 3 may be implemented as a module using fixed-function hardware and/or as software and/or as programmable logic.

Figure 4A:
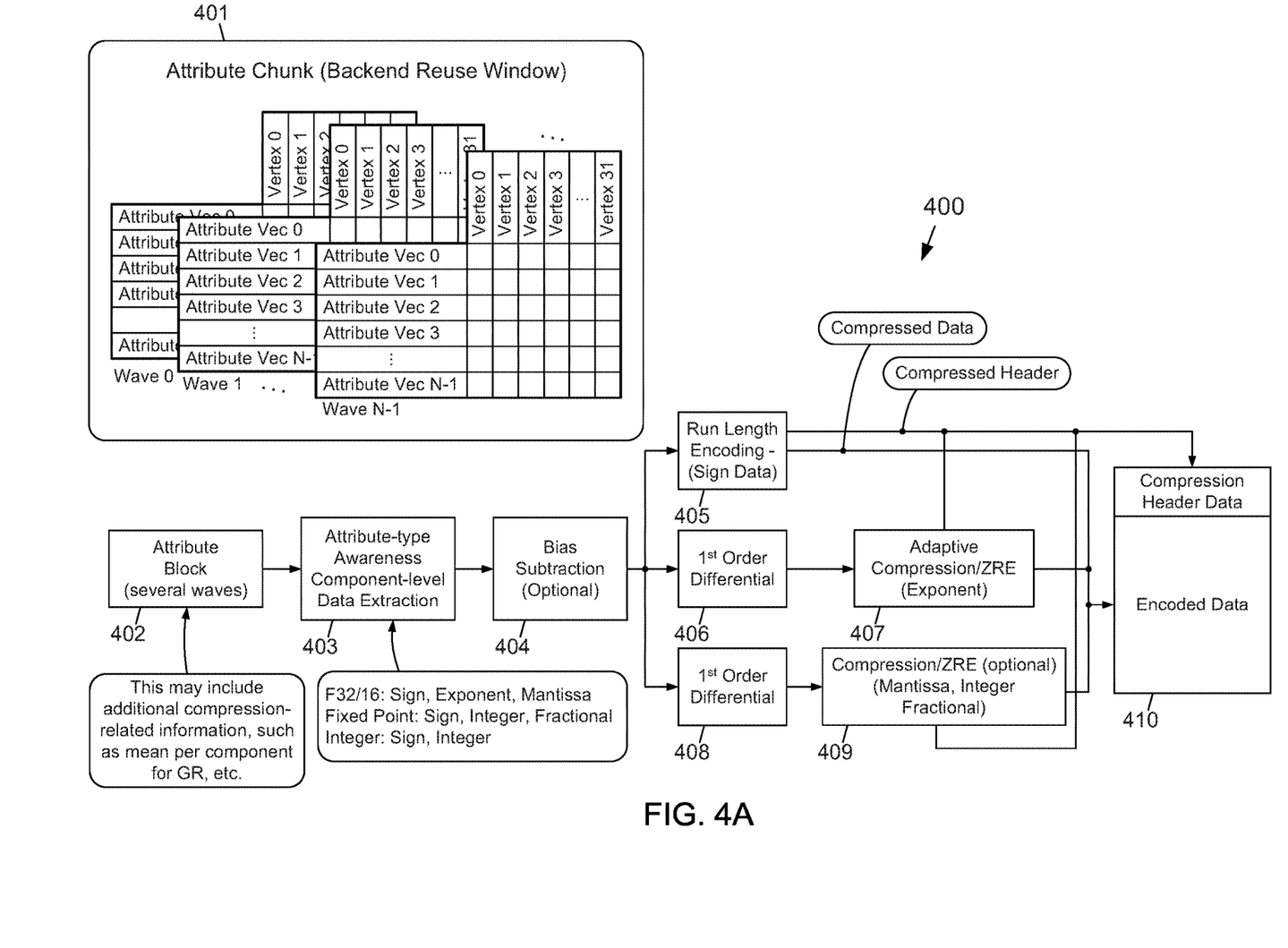
FIG. 4A depicts a more detailed flow diagram of an example embodiment of attribute compression before a binning phase according to the subject matter disclosed herein.

FIG. 4A depicts a more detailed flow diagram of an example embodiment of attribute compression 400 before a binning phase according to the subject matter disclosed herein. The attribute data may be arranged in, for example, attribute blocks for a backend reuse window that are depicted at 401. At 402, an attribute block, which may contain several waves, is received by the APC 213 (FIG. 2). A wave may be a group of vertices, and may also be referred to as a warp. In one embodiment, a wave may be 32 vertices and may not be fully packed. In another embodiment, a wave may be more than 32 vertices, or may be less than 32 vertices. A block may include post-VS attributes from less than one, exactly one, or more than one wave. The attribute blocks may include additional compression-related information, such as, but not limited to, mean per component for Golomb-Rice (GR) coding, etc. Golomb-Rice encoding uses a pivot for efficient compression. In one embodiment, mean per component has been selected as the pivot, although in another embodiment a different pivot may be selected. At 403, attribute-type awareness component-level data may be extracted. For example, if the attribute is formatted in an F32 or an F16 format, then sign data, exponent data and mantissa data is extracted. If the attribute is formatted in a fixed-point format, then sign data, integer data and fractional data is extracted. If the attribute is in an integer format, then sign data and integer data is extracted. At 404, any bias in the attribute data may be optionally subtracted from the attribute data. Any bias data may be obtained from, for example, a header associated with the attribute data.

If, at 405, the extracted data is sign data, then sign data is compressed using a run-length encoding technique.

If, at 406, the extracted data includes exponential data, then a first-order differential operation is performed on the exponent data using, for example, an exclusive OR (XOR). At 407, the exponent data may be compressed using, such as, but not limited to, a zero-run encoding technique, a Golomb-Rice encoding, delta compression, run-length encoding, and zero-encoding. A zero-run encoding encodes only repeated zero values in the exponent data by using a run-length value for repeated zero values. Non-zero values in the exponent data are not encoded.

If, at 408, the extracted data includes mantissa, integer and/or fractional data, then a first-order differential operation is performed on the attribute data using, for example, an XOR operation. At 409, the mantissa, integer and/or fractional attribute data may be compressed using such as, but not limited to, Golomb-Rice encoding, delta compression, run-length encoding, and zero-encoding. In one embodiment, a zero-run encoding may be optionally used depending on a data type encountered.

The compressed data from 405, 407 and 409 is output as compression header data and encoded data at 410, and may be stored in storage 206 (FIGS. 2 and 3).

Figure 4B:
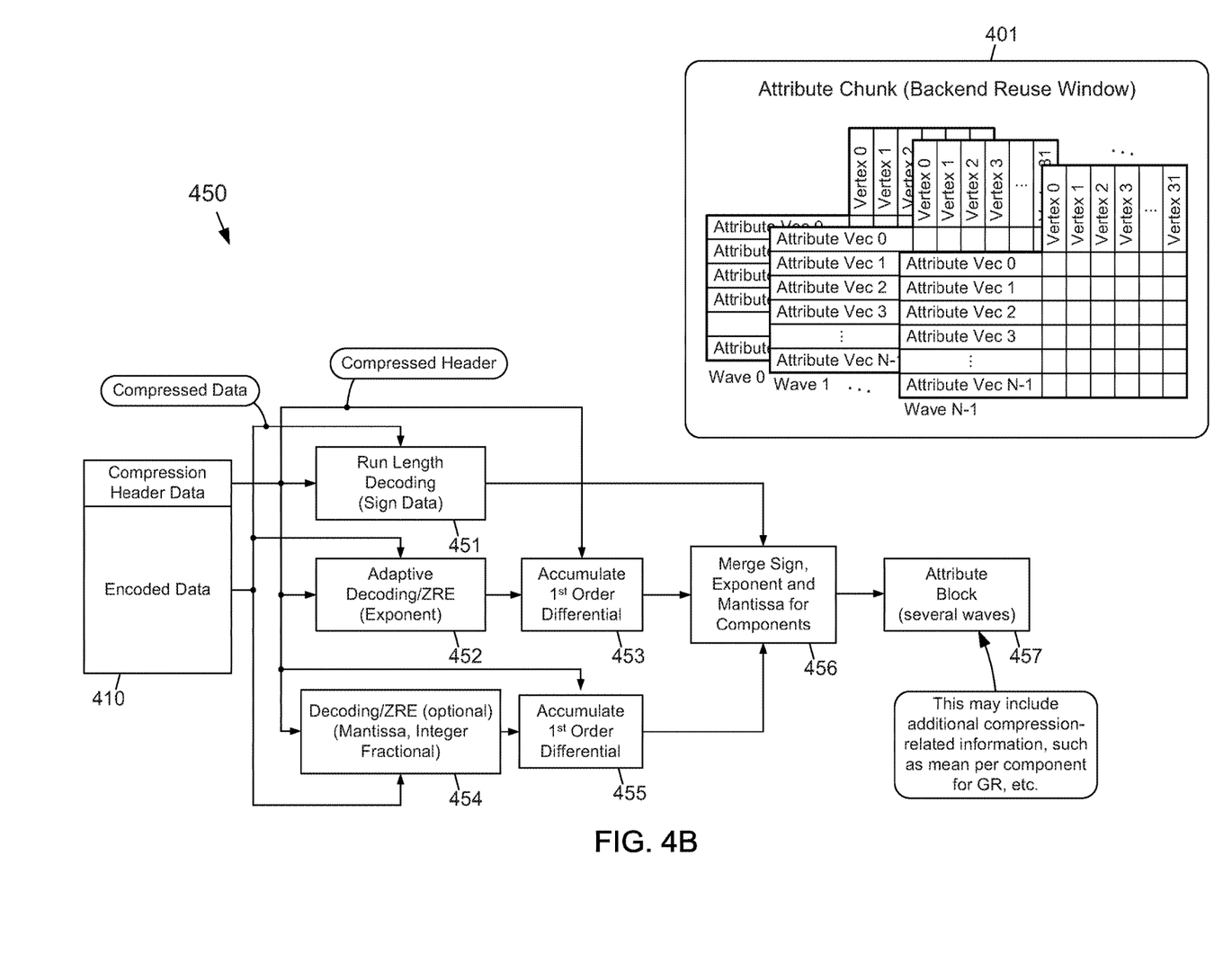
FIG. 4B depicts a more detailed flow diagram of an example embodiment of attribute decompression after a binning phase according to the subject matter disclosed herein.

FIG. 4B depicts a more detailed flow diagram of an example embodiment of attribute decompression 450 after a binning phase according to the subject matter disclosed herein. In one embodiment, attribute decompression 450 is the reverse of the compression 400 in FIG. 4A. As compressed attribute data 410 is accessed from storage 206 (FIGS. 2 and 3), the compressed header data may be used to separate the compressed attribute data into sign, exponent, and mantissa/integer/fractional data. Compressed sign data is decompressed at 451 using, for example, a run-length decoding technique. Compressed exponent data is decompressed at 452 using, such as, but not limited to, Golomb-Rice decoding, delta decompression, run-length decoding, zero-decoding, and a zero-run decoding technique. The first-order differential of the decompressed exponent data may be accumulated at 453. Compressed mantissa/integer/fractional data may be decompressed at 454, such as, but not limited to, Golomb-Rice decoding, delta decompression, run-length decoding, and zero-decoding. In one embodiment, a zero-run decoding technique may be used depending upon the type of data encountered. The first-order mantissa/integer/fractional data may be accumulated at 455. At 456, the respective components of the decompressed attribute data may be merged, and at 457 the attribute data is available for further processing as attribute blocks for a backend reuse window, such as the attribute blocks depicted at 401 in FIG. 4B. The attribute blocks may include additional compression-related information, such as, but not limited to, mean per component for GR, etc.

Figure 5:
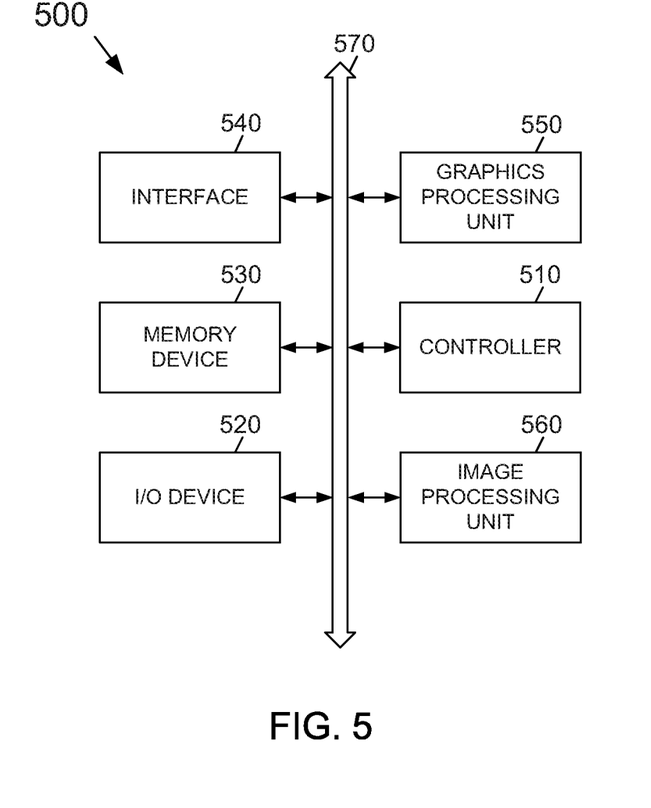
FIG. 5 depicts an electronic device that includes a GPU that includes an attribute compressor that compresses positional and non-positional attribute data according to the subject matter disclosed herein.

FIG. 5 depicts an electronic device 500 that includes a GPU that includes a backend pipe of a shader core that compresses positional and non-positional attribute data according to the subject matter disclosed herein. Electronic device 500 may be used in, but not limited to, a computing device, a personal digital assistant (PDA), a laptop computer, a mobile computer, a web tablet, a wireless phone, a cell phone, a smart phone, a digital music player, or a wireline or wireless electronic device. The electronic device 500 may include a controller 510, an input/output device 520 such as, but not limited to, a keypad, a keyboard, a display, a touch-screen display, a camera, and/or an image sensor, a memory 530, an interface 540, a GPU 550, and an imaging processing unit 560 that are coupled to each other through a bus 570. The controller 510 may include, for example, at least one microprocessor, at least one digital signal processor, at least one microcontroller, or the like. The memory 530 may be configured to store a command code to be used by the controller 510 or a user data.

Electronic device 500 and the various system components of electronic device 500 may include a GPU that includes a frontend and backend pipe of a shader core that compresses positional and non-positional attribute data according to the subject matter disclosed herein. The interface 540 may be configured to include a wireless interface that is configured to transmit data to or receive data from a wireless communication network using a RF signal. The wireless interface 540 may include, for example, an antenna, a wireless transceiver and so on. The electronic system 500 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of, data-processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method, comprising:
    determining whether a format of one or more attributes of a vertex that is output from a vertex shader comprises a floating-point format, a fixed-point format or an integer format, the one or more attributes comprising one or more positional attributes and one or more non-positional attributes;
    separating each of the one or more attributes into parts based on the format of the attribute, the parts including an integer part and a sign part;
    compressing each respective part of the attribute based on a type of the part, including compressing the sign part using a run-length encoding and compressing the integer part using an encoding scheme other than run-length encoding; and
    storing in a memory the compressed parts of the attribute of the vertex.

2. The method of claim 1, wherein the format of a first attribute comprises the floating-point format,
    wherein parts of the first attribute in the floating-point format further comprise an exponent part, and a mantissa part, and
    wherein compressing the exponent part and the mantissa part of the first attribute in the floating-point format comprises:
    determining a first order differential of the exponent part;
    compressing the exponent part using a zero-run encoding and a Golomb-Rice coding;
    determining a first order differential of the mantissa part; and
    compressing the mantissa part using a Golomb-Rice coding.

3. The method of claim 2, wherein the format of a second attribute comprises the fixed-point format,
    wherein parts of the second attribute in the fixed-point format further comprise an integer part, and a fractional part, and
    wherein compressing the integer part and the fractional part of the second attribute in the fixed-point format comprises:
    determining a first order differential of the integer part;
    compressing the integer part using a Golomb-Rice coding;
    determining a first order differential of the fractional part; and
    compressing the fractional part using a Golomb-Rice coding.

4. The method of claim 3, wherein the format of a third attribute comprises the integer format,
    wherein parts of the third attribute in the integer format further comprise an integer part, and
    wherein compressing the integer part of the third attribute in the integer format comprises:
    determining a first order differential of the integer part; and
    compressing the integer part using a Golomb-Rice coding.

5. The method of claim 1, wherein the format of a first attribute comprises the fixed-point format,
    wherein parts of the first attribute in the fixed-point format further comprise an integer part, and a fractional part, and
    wherein compressing the integer part and the fractional part of the first attribute in the fixed-point format comprises:
    compressing the integer part using a Golomb-Rice coding; and
    compressing the fractional part using a Golomb-Rice coding.

6. The method of claim 1, wherein the format a first attribute comprises the integer format,
    wherein parts of the first attribute in the integer format further comprise an integer part, and
    wherein compressing the integer part of the first attribute in the integer format comprises:
    compressing the integer part using a Golomb-Rice coding.

7. The method of claim 1, further comprising remapping the one or more attributes of the vertex shader from an array of structure arrangement to a structure of array arrangement.

8. The method of claim 1, further comprising:
    reading from the memory the compressed parts of a first attribute of the vertex,
    decompressing the compressed parts of the first attribute by:
    using a run-length decoding based on a compressed part comprising a sign part of the first attribute;
    using a zero-run encoding and a Golomb-Rice decoding based on a compressed part comprising an exponent part of the first attribute; and
    using a Golomb-Rice decoding based on a compressed part comprising one of a mantissa part, an integer part, and a fractional part of the first attribute.

9. A method, comprising:
    reading from a memory compressed parts of an attribute of a vertex; and
    decompressing the compressed parts of the attribute by:
    using a run-length decoding based on a compressed part comprising a sign part of the attribute;
    using a zero-run decoding and a Golomb-Rice decoding based on a compressed part comprising an exponent part of the attribute; and
    using a Golomb-Rice decoding based on a compressed part comprising one of a mantissa part, an integer part, and a fractional part of the attribute.

10. The method of claim 9, the method further comprising compressing parts of the attribute of the vertex by:
    determining a format of the attribute of the vertex;

separating the attribute into parts based on the format of the attribute;

compressing each respective part of the attribute based on a type of the part; and storing in the memory the compressed parts of the attribute of the vertex.

11. The method of claim 9, wherein a format of a first attribute comprises a floating-point format, wherein parts of the first attribute in the floating-point format comprise a sign part, an exponent part, and a mantissa part, and wherein compressing each respective part of the first attribute in the floating-point format comprises:

compressing the sign part using a run-length encoding;

compressing the exponent part using a zero-run coding and a Golomb-Rice coding; and compressing the mantissa part using a Golomb-Rice coding.

12. The method of claim 9, wherein a format of a first attribute comprises a fixed-point format, wherein parts of the first attribute in the fixed-point format comprise a sign part, an integer part, and a fractional part, and wherein compressing each respective part of the first attribute in the fixed-point format comprises:

compressing the sign part using a run-length encoding;

compressing the integer part using a Golomb-Rice coding; and compressing the fractional part using a Golomb-Rice coding.

13. The method of claim 9, wherein a format of a first attribute comprises an integer format, wherein parts of the first attribute in the integer format comprise a sign part and an integer part, and wherein compressing each respective part of the first attribute in the integer format comprises:

compressing the sign part using a run-length encoding; and compressing the integer part using a Golomb-Rice coding.

14. A graphics pipeline of a graphics processing unit, the graphics pipeline comprising: a compressor that receives one or more attributes of a vertex that is output from a vertex shader, the compressor determining whether a format of each attribute comprises a floating-point format, a fixed-point format or an integer format, separating each attribute into parts based on the format of the attribute, the parts including an integer part and a sign part, compressing a sign part of each attribute using a run-length encoding, compressing the integer part using an encoding scheme other than run-length encoding, compressing each respective part of the attribute other than the sign part and integer part based on a type of the part of the attribute, and storing in a memory the compressed parts of the attribute.

15. The graphics pipeline of claim 14, wherein the format of a first attribute comprises the floating-point format, wherein parts of the first attribute in the floating-point format further comprise an exponent part, and a mantissa part, and wherein the compressor compresses the exponent part and the mantissa of the first attribute in the floating-point format by:

determining a first order differential of the exponent part;

compressing the exponent part using a zero-run encoding and a Golomb-Rice coding;

determining a first order differential of the mantissa part; and compressing the mantissa part using a Golomb-Rice coding.

16. The graphics pipeline of claim 15, wherein the format of a second attribute comprises the fixed-point format, wherein parts of the second attribute in the fixed-point format further comprise an integer part, and a fractional part, and wherein the compressor compresses the integer part and the fractional part of the second attribute in the fixed-point format by:

determining a first order differential of the integer part;

compressing the integer part using a Golomb-Rice coding;

determining a first order differential of the fractional part; and compressing the fractional part using a Golomb-Rice coding.

17. The graphics pipeline of claim 16, wherein the format of a third attribute comprises the integer format, wherein parts of the third attribute in the integer format further comprise an integer part, and wherein the compressor compresses the integer part of the third attribute in the integer format by:

determining a first order differential of the integer part; and compressing the integer part using a Golomb-Rice coding.

18. The graphics pipeline of claim 14, wherein the format of the attribute comprises the fixed-point format, wherein parts of the attribute in the fixed-point format further comprise an integer part, and a fractional part, and wherein the compressor compresses the integer part and the fractional part of the attribute in the fixed-point format by:

compressing the integer part using a Golomb-Rice coding; and compressing the fractional part using a Golomb-Rice coding.

19. The graphics pipeline of claim 14, wherein the format the attribute comprises the integer format, wherein parts of the attribute in the integer format further comprise an integer part, and wherein the compressor compresses the integer part of the attribute in the integer format by:

compressing the integer part using a Golomb-Rice coding.

20. The graphics pipeline of claim 14, wherein the compressor further remaps the one or more attributes of the vertex shader from an array of structure arrangement to a structure of array arrangement.

* * * * *